(12) United States Patent
Kogiso

(10) Patent No.: US 6,666,293 B2
(45) Date of Patent: Dec. 23, 2003

(54) POTENTIOMETER FOR ELECTRIC POWER STEERING SYSTEM

(75) Inventor: Yoshinori Kogiso, Mizunami (JP)

(73) Assignee: Kayaba Industry Co., Ltd., Tokyo (JP)

( * ) Notice: Subject to any disclaimer, the term of this patent is extended or adjusted under 35 U.S.C. 154(b) by 231 days.

(21) Appl. No.: 09/847,457

(22) Filed: May 2, 2001

(65) Prior Publication Data
US 2002/0162701 A1 Nov. 7, 2002

(51) Int. Cl.⁷ .................................. B62D 5/04
(52) U.S. Cl. ............. 180/444; 73/862.325; 324/207.21; 324/207.25
(58) Field of Search ................ 180/443, 444, 180/445, 446; 73/862.333, 862.337, 862.625, 862.632, 862.637, 862.69, 862.325; 340/686.3, 686.6; 324/207.21, 207.2, 207.25

(56) References Cited

U.S. PATENT DOCUMENTS

| | | | | |
|---|---|---|---|---|
| 4,676,331 A | * | 6/1987 | Iwaki et al. | 180/443 |
| 4,703,261 A | * | 10/1987 | Berchtold | 324/207.2 |
| 4,724,710 A | * | 2/1988 | Murty | 73/862.23 |
| 4,862,982 A | * | 9/1989 | Saito et al. | 180/443 |
| 4,865,145 A | * | 9/1989 | Ijiri et al. | 180/444 |
| 5,661,466 A | * | 8/1997 | Pearson | 180/444 |
| 6,295,879 B1 | * | 10/2001 | Miller et al. | 180/444 |
| 6,366,080 B1 | * | 4/2002 | Eberhart et al. | 324/207.22 |
| 6,374,941 B1 | * | 4/2002 | Forborgen | 180/444 |
| 6,489,761 B1 | * | 12/2002 | Schroeder et al. | 324/207.25 |
| 2002/0079156 A1 | * | 6/2002 | Nazars | 180/442 |
| 2002/0112549 A1 | * | 8/2002 | Cheshmehdoost et al. | 73/862.333 |

FOREIGN PATENT DOCUMENTS

| | | |
|---|---|---|
| JP | 2102315 | 1/1993 |
| JP | 09-049090 | 9/1998 |
| JP | 09-268882 | 4/1999 |

* cited by examiner

Primary Examiner—Anne Marie Boehler
(74) Attorney, Agent, or Firm—The Maxham Firm

(57) ABSTRACT

A potentiometer to be utilized in an electric power steering system of a vehicle for generation of assist torque. The power steering system includes a torsion bar spring which receives steering torque and is twisted by the torque. The potentiometer comprises a magnet device having two magnetic polar faces, which create a magnetic field and a magneto-sensitive device placed in the magnetic field. The magnet device is rotatable relative to the magneto-sensitive device in proportion to the twist of the torsion bar spring and changes the relative angle between the magneto-sensitive device and the magnetic field causing the potentiometer to generate voltage for use in generating assist torque.

18 Claims, 8 Drawing Sheets

POTENTIOMETER FOR ELECTRIC POWER STEERING SYSTEM

BACKGROUND OF THE INVENTION

1. Field of the Invention

The present invention generally relates to an electric power steering system of a vehicle. More particularly, this invention relates to a potentiometer for use in an electric power steering system of a vehicle.

2. Discussion of the Related Art

In an electric power steering system of a vehicle, a potentiometer is linked with a torsion bar spring which receives the steering torque from the steering wheel of the vehicle.

A conventional potentiometer is designed to provide voltage to be supplied to an assist motor in proportion to the steering torque received on the torsion bar spring by sliding a brush device along the surface of an electric resister device in order to change electrical resistance for generation of the output voltage. The assist motor generates torque power corresponding to the voltage supplied from the potentiometer, and assists in steering the front wheels of a vehicle.

The surface of the brush device and the surface of the resister device will eventually get roughened or otherwise deteriorated due to repeated friction between the brush device and the resister device. The roughened and deteriorated surfaces of the brush device and resister device may malfunction by losing adequate physical contact with each other intermittently while in use, resulting in discontinuity or interruption in the performance of the electric power steering system, which will also generate noises in the voltage signals from the potentiometer. Such discontinuity or interruption of the performance of the power steering system may potentially result in serious malfunctioning of the whole system.

SUMMARY OF THE INVENTION

Accordingly, it is an object of the present invention to provide a potentiometer for use in an electric power steering system of a vehicle which effectively prevents accidental discontinuity or interruption in the performance of the potentiometer or the electric power steering system.

It is another object of the present invention to provide a potentiometer for use in an electric power steering system of a vehicle which effectively prevents accidental generation of noises in the output voltage signals from the potentiometer.

It is yet another object of the present invention to provide a potentiometer with greatly improved durability and reliability.

Other objects of the present invention will become apparent from the description that follows.

Those and other objects of the present invention will be achieved with a potentiometer of the present invention which is constructed as described hereinbelow.

A potentiometer of the present invention to be used in an electric power steering system of a vehicle does not rely on a brush device or a resister device as a conventional potentiometer does. Instead, the potentiometer of the present invention utilizes a magneto-sensitive device (a magneto-sensitive element or elements) to be placed in a magnetic field generated between a pair of magnetic polar faces of a magnet device. The magneto-sensitive element is generally provided in a rectangular configuration. Other configurations of the magneto-sensitive element will equally function. The potentiometer of the present invention provides an output voltage to an assist motor based on the angular displacement information from the magneto-sensitive element placed in the magnetic field of the magnet device. The magnetic field is affected when the magneto-sensitive element changes its angular position in relation to the direction of the magnetic flux in a manner well known in the relevant art. The assist motor generates power according to the output voltage supplied from the potentiometer, which assists in steering the front wheels of the vehicle as is also known in the related art.

Steering torque generated on the steering wheel of the vehicle is transmitted to a torsion bar spring and twists the torsion bar spring to a degree in proportion to the steering torque. The potentiometer linked to the torsion bar spring utilizes the magnet device described in the above, and outputs voltage in proportion to the twist of the torsion bar spring. The output voltage is utilized by the assist motor.

The potentiometer further comprises a housing having an engagement bore, a magnet casing partially and rotationally engaging the engagement bore of the housing, and an element casing installed co-axially with the engagement bore of the housing. The magnet casing turns an angle in proportion to the twist of the torsion bar spring. The magnet device having a pair of magnetic polar faces is installed centrally in the magnet casing. The magneto-sensitive element is placed in the magnetic field generated between the magnetic polar faces without touching the polar faces.

The potentiometer of the present invention does not rely on frictional elements for its function, which renders the potentiometer of the present invention exceptionally durable and reliable. Discontinuity or interruption and noises in the output voltage from the potentiometer can be effectively eliminated unlike a conventional potentiometer which utilizes a brush device and a resister device.

The magnet device in a preferred embodiment comprises a permanent magnet base and a pair of legs of a magnetic material, each generally having a "U" shape. The magnetic legs stretch in parallel respectively from two opposite ends of the magnet base. Each of the free ends of the magnetic legs is provided with a hook portion having a magnetic polar face on its outer end. The magnetic polar faces are provided apart in planar parallel, facing each other.

The magnetic polar faces provide a stable magnetic field therebetween helped by the specific configuration of the generally U-shaped magnet device of the present invention and by the sturdy construction supporting the magnet device. The stable magnetic field or flux effectively helps prevent fluctuation in the output voltage of the potentiometer by eliminating adverse effects to be otherwise caused by oscillation of the magneto-sensitive element due to vehicle vibrations. A certain degree of accidental displacement of the magneto-sensitive element in the "stable" magnetic field will be effectively compensated as will be appreciated by ordinary artisans in the related field.

The magnet device may be integrated into the magnetic casing, with the magnetic polar faces exposed, which will reduce fabrication time, and further help stabilize the performance of the potentiometer of the present invention.

The angular position of the element casing which houses the magneto-sensitive element is adjustable in a circumferential direction relative to the housing. This arrangement provides precise setting of the initial output value of the magneto-sensitive element at "O" for its neutral position.

The magneto-sensitive element may be electrically connected with an output amplifier and an output adjuster so that any possible fluctuation in the output voltage of the potentiometer may be thoroughly eliminated.

The invention also provides a potentiometer having a means for creating a magnetic field. In additional embodiments, the means for creating a magnetic field comprises a magnet device having two magnetic polar faces which create a magnetic field therebetween.

The invention further provides methods to steer a vehicle using the potentiometer provided herein. One method involves turning a steering wheel that is connected to a torsion bar spring where this turning causes the torsion bar spring to twist by an angle. This twisting causes a potentiometer linked to the torsion bar spring to generate an output voltage in proportion to the twist of the torsion bar. The output voltage is transmitted to an assist motor which steers a wheel on the vehicle. The potentiometer has a magnet device having two magnetic polar faces which create a magnetic field therebetween, and a magneto-sensitive device placed in said magnetic field between the magnetic polar faces. The magnet device is rotatable relative to the magneto-sensitive device in proportion to the twist of the torsion bar spring and changes the relative angle between the magneto-sensitive device and the magnetic field causes the potentiometer to generate voltage for use in generating assist torque.

BRIEF DESCRIPTION OF THE DRAWINGS

The present invention is described in further detail hereinbelow using the accompanying drawings, in which.

DETAILED DESCRIPTION OF THE PREFERRED EMBODIMENTS

Figure 9:
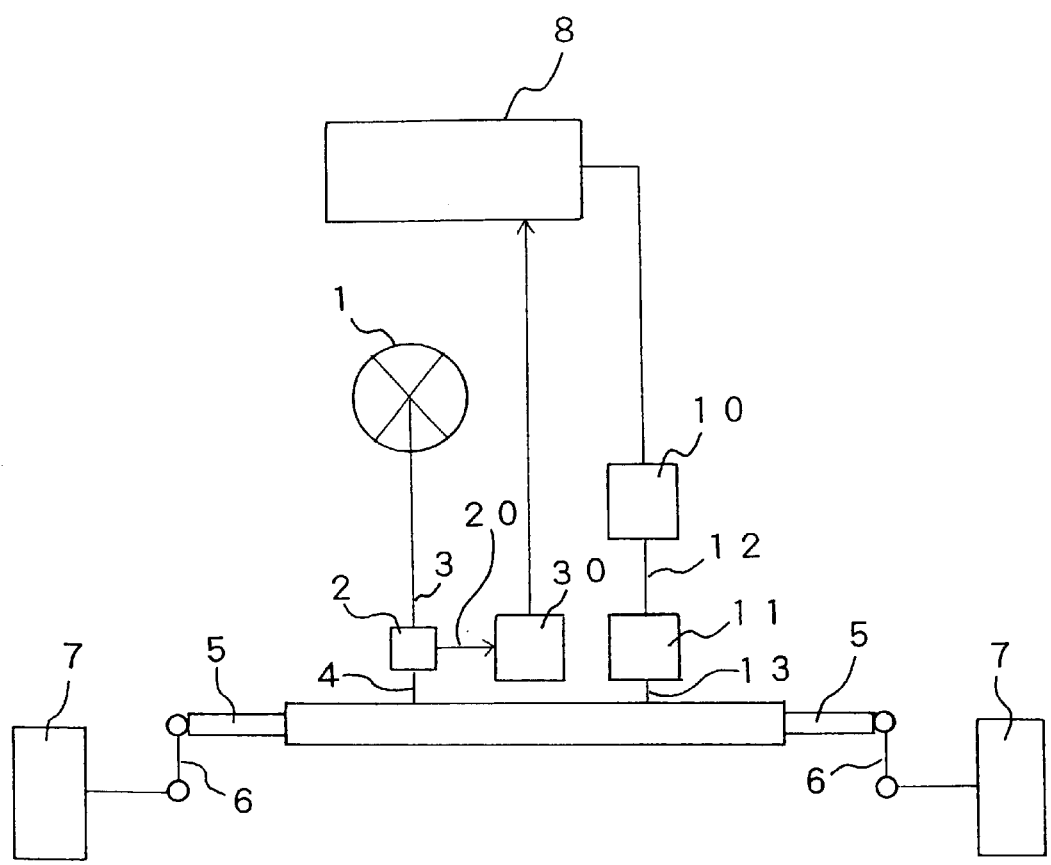
FIG. 9 is a diagram schematically showing an electric power steering system according to the present invention.

An electric power steering system as mounted on a vehicle (not shown) is schematically shown in FIG. 9. Steering torque generated on the steering wheel 1 of the vehicle is transmitted to a gear box or case 2 through an input shaft 3 of the gear case 2, and transmitted therefrom through a torsion bar spring 21 (not shown here) and an output shaft 4 to pinion means (not shown). The pinion means drives rack means 5. The rack means 5 energizes link means 6, which steers the front wheels 7 of the vehicle.

The torsion bar spring 21 is twisted to a degree which corresponds to the steering torque generated on the steering wheel 1. A potentiometer 30 according to a preferred embodiment of the present invention outputs voltage in proportion to the degree of twist of the torsion bar spring 21. The output voltage is input in an electric control unit (ECU) 8, which generates electrical signals corresponding to the input voltage. An assist motor 10 is activated by the signals generated by ECU 8.

The assist torque generated by the assist motor 10 is transmitted to another gear case 11 via an input shaft 12 of the gear case 11 and to another pinion means (not shown) via an output shaft 13 of the gear case 11 to drive the rack means 5.

The rack means 5 is thus dually powered both mechanically through the output shaft 4 linking with the steering wheel 1 and electrically though the output shaft 13 linking with the assist motor 10.

Figure 10:
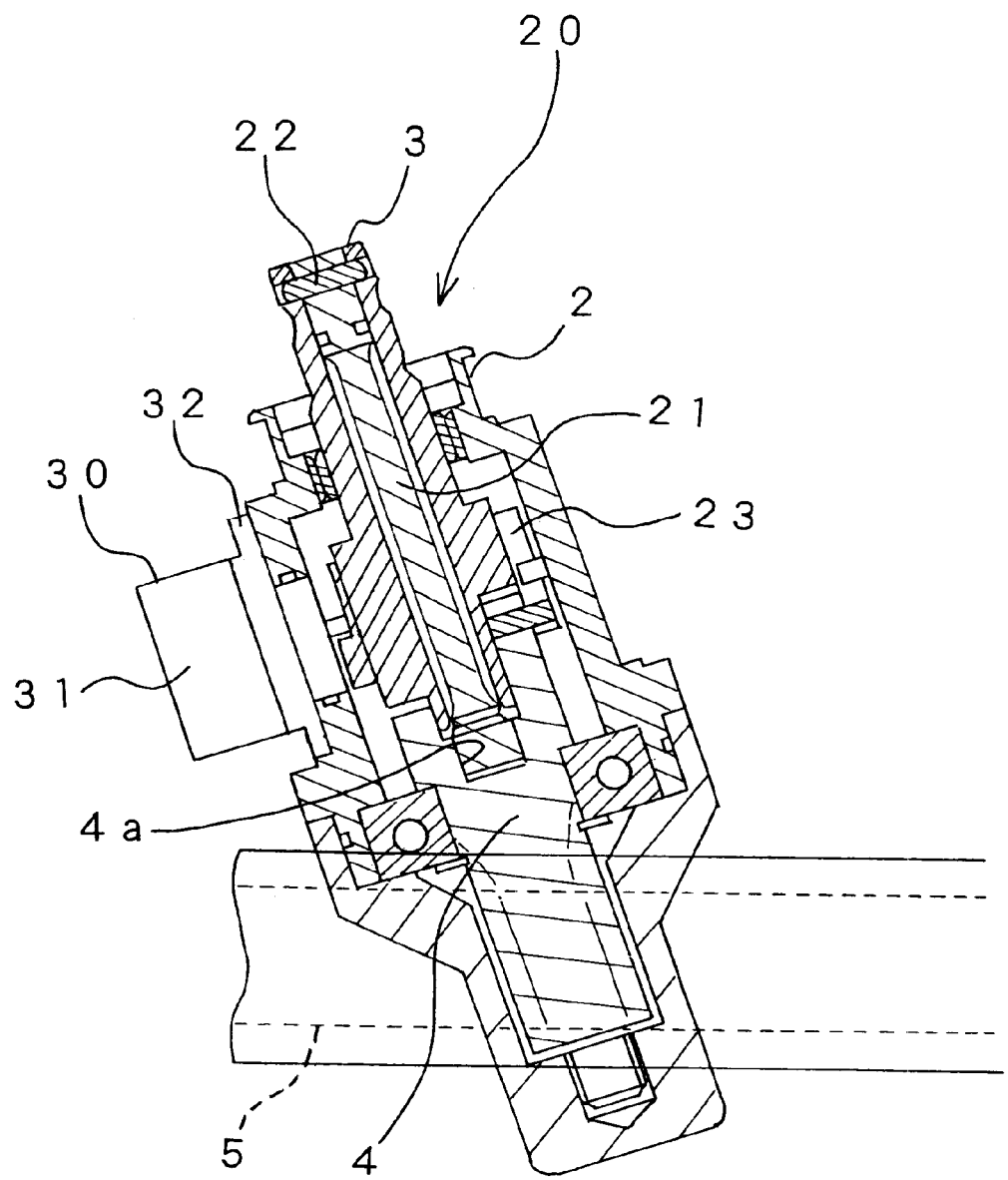
FIG. 10 is a sectional view of a steering torque sensor according to an embodiment of the present invention.
Figure 11:
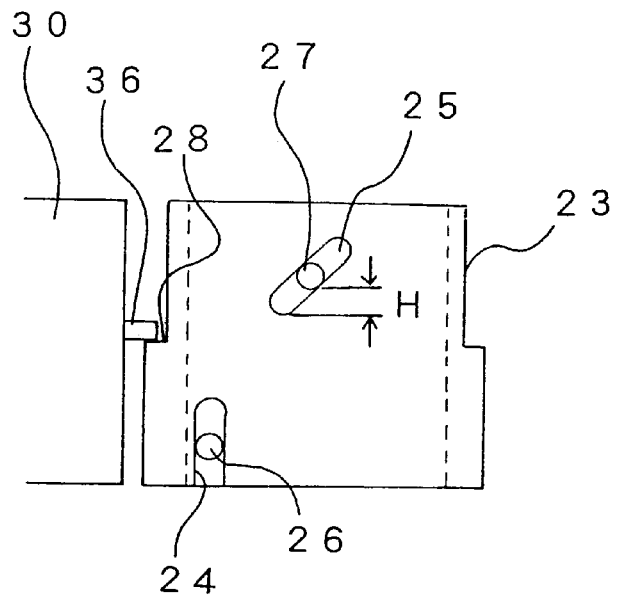
FIG. 11 is a front view of a sleeve of the steering torque sensor.

FIGS. 10 and 11 show a steering torque sensor 20 according to an embodiment of the present invention which is incorporated in the electric power steering system of the invention. The steering torque sensor 20 utilizes the torsion bar spring 21 to detect the steering torque generated on the steering wheel 1. The input shaft 3 and the output shaft 4 are connected with the gear case 2 respectively on the input side and the output side of the gear case 2. The torsion bar spring 21 is integrally connected at an end thereof with the input shaft 3 and at the other end with a hole 4a of the output shaft 4. The steering torque transmitted to the input shaft 3 is transmitted to the output shaft 4 via the torsion bar spring 21.

There is provided a sleeve 23 enclosing the input shaft 3. As shown in FIG. 11, the sleeve 23 is provided with a circumferential step 28. The sleeve 23 is also provided with an elongated groove 24 and a slant groove 25. The elongated groove 24 and the slant groove 25 run axially in the steering torque sensor 20. Within the elongated groove 24 is provided an output pin 26 and within the slant groove 25 is provided an input pin 27. The output pin 26 is secured to the output shaft 4 and the input pin 27 is secured to the input shaft 3.

The steering torque generated on the steering wheel 1 twists the torsion bar spring 21 to a degree or angle which corresponds to the steering torque, generating angular divergence between the input shaft 3 and the output shaft 4. The input pin 27 slides in the slant groove 25, causing the sleeve 23 to move a distance or height "H" shown in FIG. 11. The steering torque sensor 20 detects this distance "H" as its measurement of the steering torque.

Figure 1:
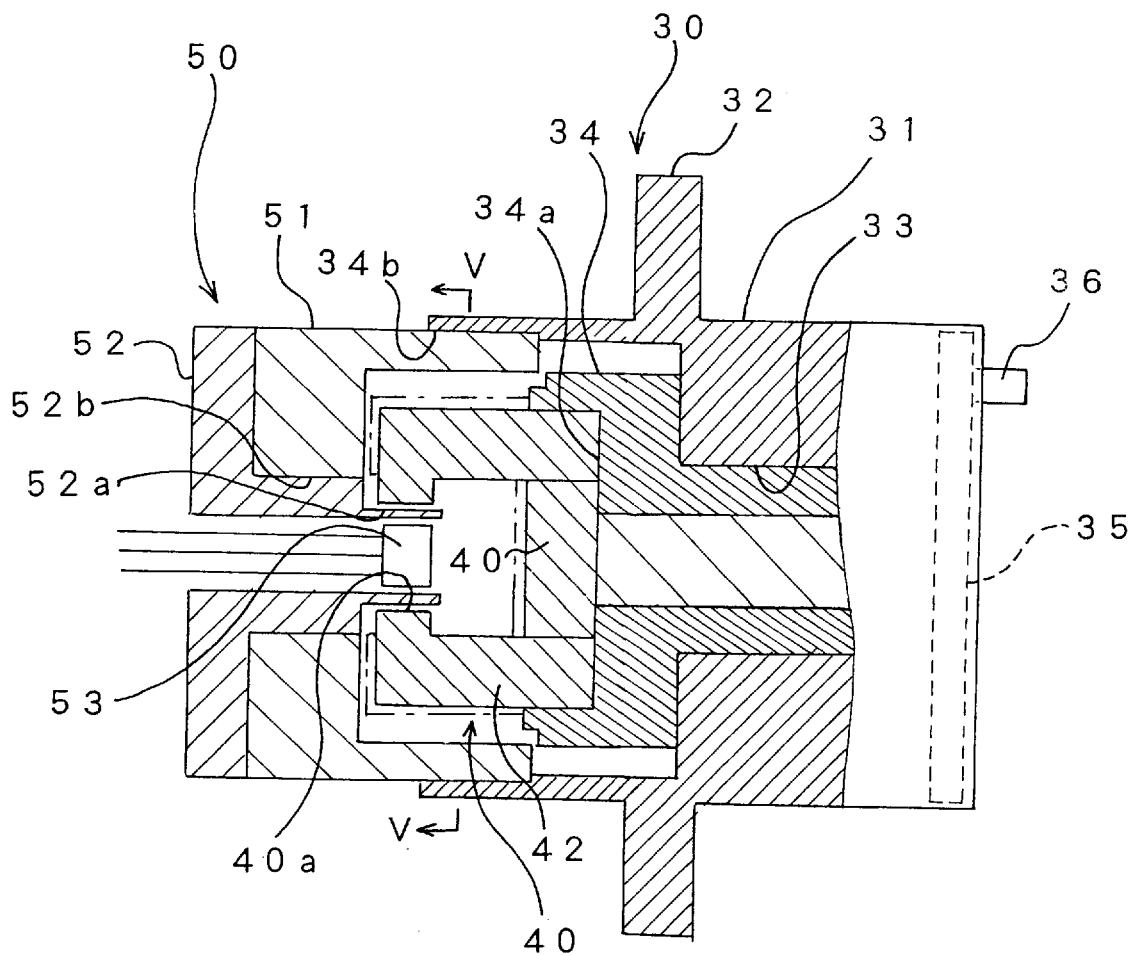
FIG. 1 is a sectional view of a potentiometer according to an embodiment of the present invention.
Figure 2:
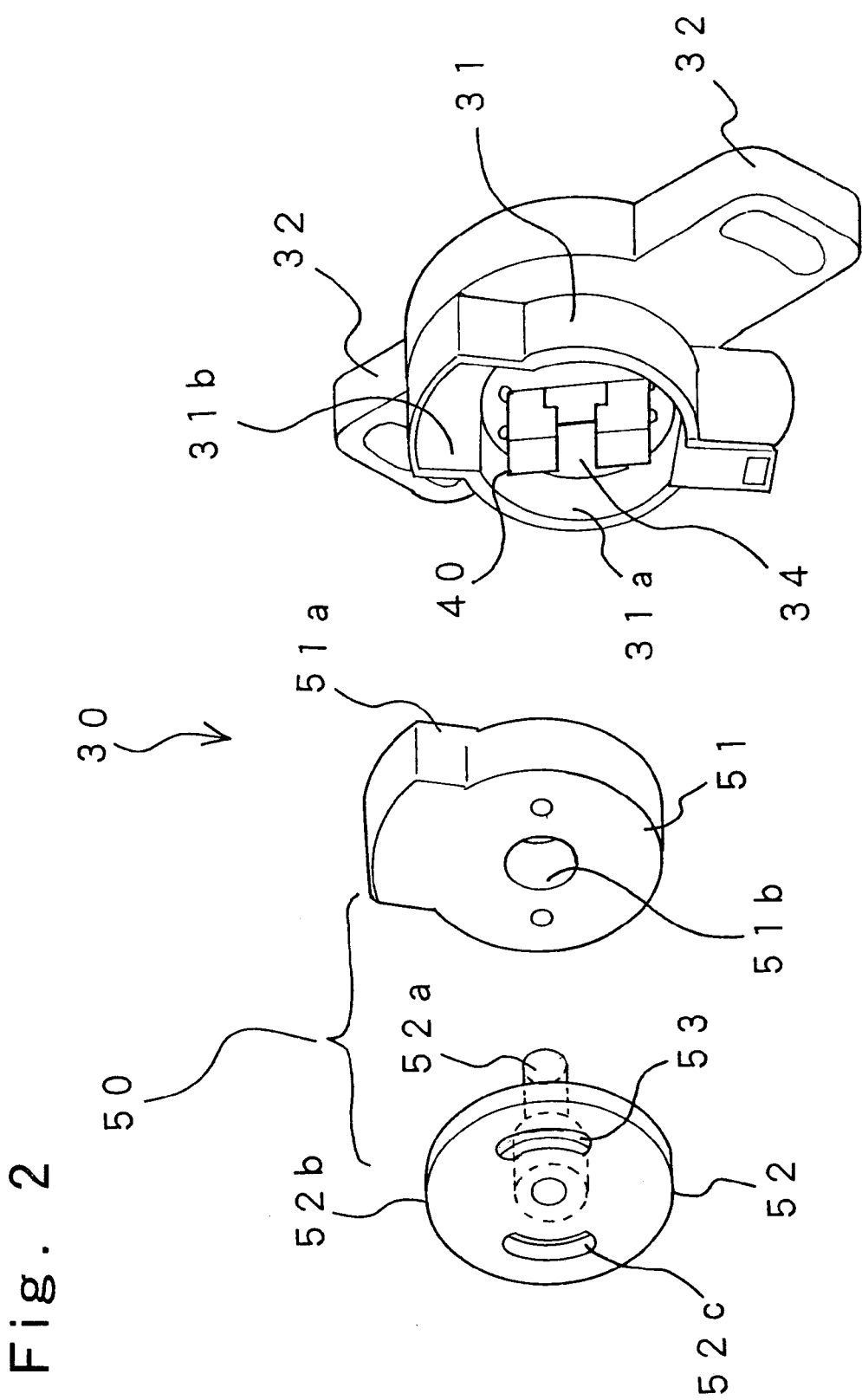
FIG. 2 is an exploded view of the potentiometer of FIG. 1.

The potentiometer 30 is shown in detail in FIG. 1. The potentiometer 30 is partially encased in a cylindrical housing 31 having a flange 32, which is secured to the gear case 2. The housing 31 is provided with an axial engagement bore 33 which receives a magnet casing 34. The magnet casing 34 can pivot within the engagement bore 33. The housing 31 is provided with an inner wall 31a and a turn stop engagement 31b as shown in FIG. 2.

Figure 4:
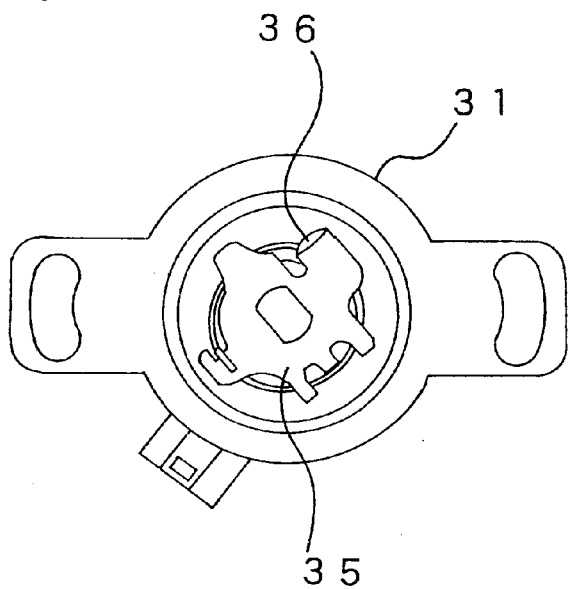
FIG. 4 is a rear view of the potentiometer.

The magnet casing 34 having a socket 34a receives the magnet device 40 in the socket 34a on an end thereof outside the engagement bore 33 and has a turn plate 35 on the other end. The turn plate 35 is shown in detail in FIG. 4. The turn plate 35 is provided with a protrusion 36, which is biased by a spring (not shown) onto the circumferential step 28 as shown in FIG. 11. The twist torsion of the torsion bar spring 21 is transmitted through the protrusion 36 and the circumferential step 28 to the magnet casing 34 and causes the magnet casing 34 to turn.

Figure 3:
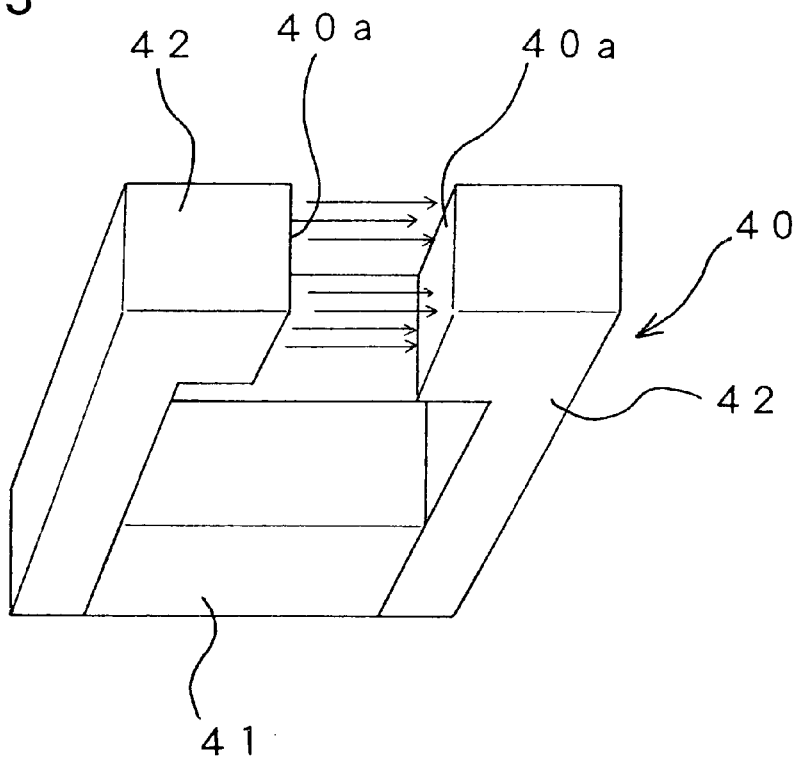
FIG. 3 is a perspective view of a magnet device according to a preferred embodiment of the invention.

FIG. 3 shows the magnet device 40. The magnet device 40 consists of a permanent magnet base 41 and a pair of magnetic legs 42 which respectively stretch at a normal angle from two opposite ends of the magnet base 41. The magnetic legs 42 are hooked at their free ends toward each other. The generally L-shaped magnetic legs 42 are made of a magnetic material. The hooked portions of the magnetic legs 42 provide magnetic polar faces 40a which face each other. The magnetic polar faces 40a provide a magnetic field therebetween. Also as contemplated herein, the invention comprises a means for creating a magnetic field. In one embodiment, a means for creating a magnetic field comprises a magnet device having two magnetic polar faces which create a magnetic field therebetween. However, those skilled in the art understand that the means is not limited solely to such a magnet device. Other means for creating a two magnetic polar faces are also contemplated by the means herein.

In another embodiment of the present invention, the magnet device 40 is wholly encased in the magnet casing 34 except the magnetic polar faces 40a, which are exposed to provide a magnetic field, as shown by broken lines in FIG. 1.

The potentiometer 30 further comprises an element casing 50 which consists of a base casing member 51 and an adjustment casing member 52 (see FIG. 2). The base casing member 51 is provided with a turn stop protrusion 51a and an axial bore 51b. The engagement casing member 52 is provided with an axial cylinder 52a, a flange portion 52b and adjustment openings 52c provided in an arc configuration.

Figure 5:
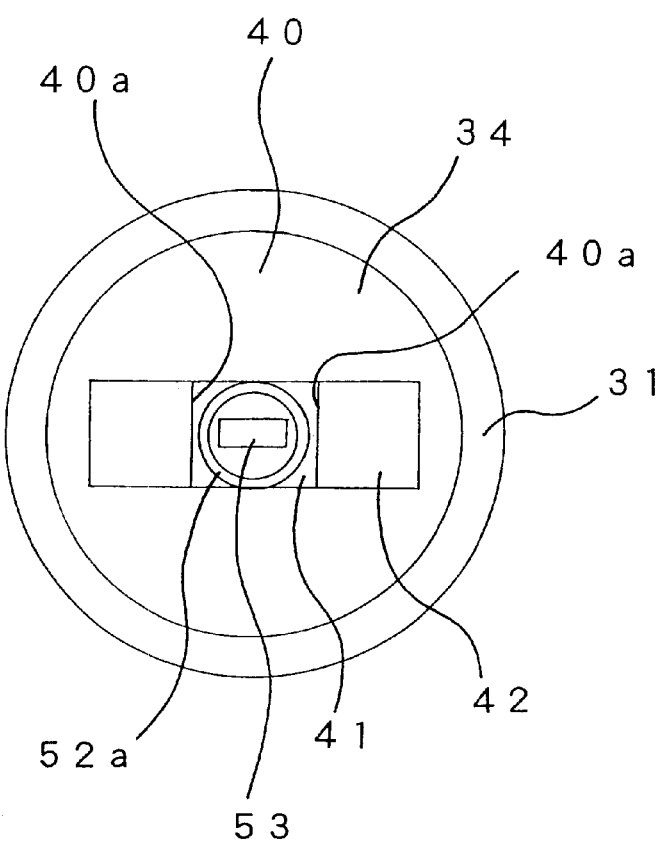
FIG. 5 is a sectional view of the potentiometer of FIG. 1 taken along V—V line.

The element casing 50 partially encloses the magnet device 40 opposite from the magnet casing 34. The base casing member 51 is received within the inner wall 31a of the housing 31 (see FIG. 2). The turn stop protrusion 51a is inserted into the turn stop engagement 31b, which holds the base casing member 51 from turning. The axial cylinder 52a of the adjustment casing member 52 is inserted in the axial bore 51b of the base casing member 51. The axial cylinder 52a is set at a center between the magnetic polar faces 40a. A magneto-sensitive device or a magneto-sensitive element 53 is placed within the axial cylinder 52a as shown in FIG. 5. There is provided a gap between the axial cylinder 52a and the magnetic polar faces 40a so that the axial cylinder 52a does not contact the magnetic polar faces 40a.

Figure 8:
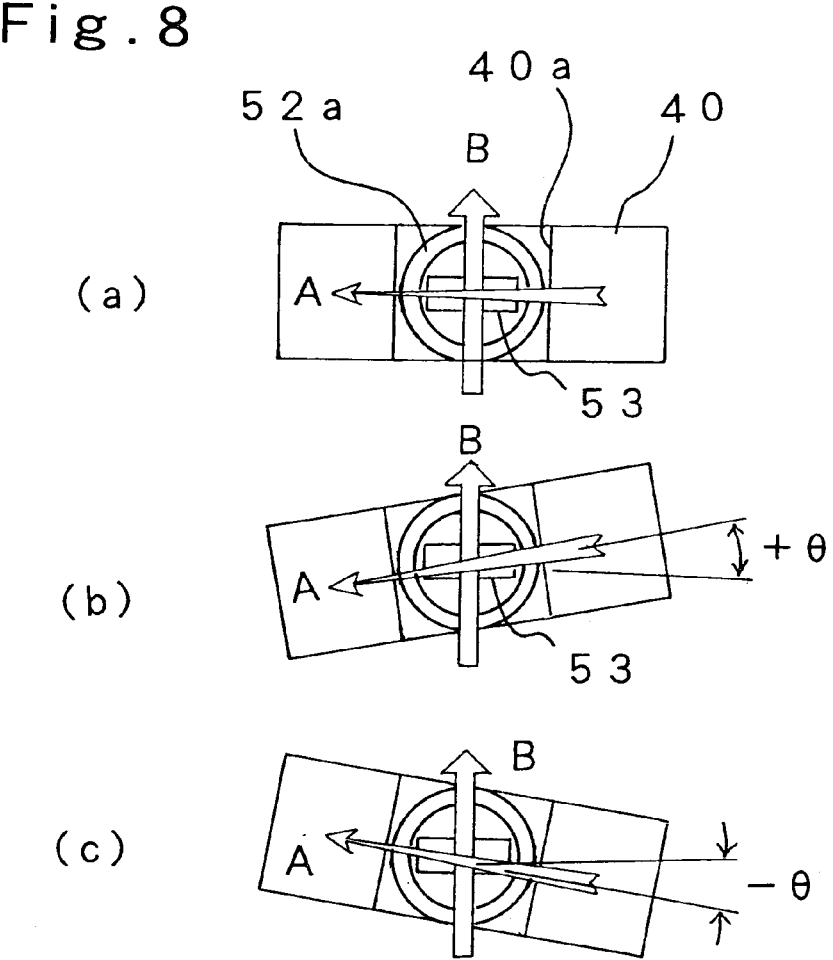
FIG. 8 shows changes in the angular position of the magneto-sensitive element.

The flange portion 52b of the adjustment casing member 52 is held in contact with the base casing member 51. The adjustment openings 52c facilitate precise adjustment of the attachment angle to the base casing member 51 or the magnet casing 34. This precision adjustment of the relative angle facilitates precision relative positional adjustment of the magnetic polar faces 40a and the magneto-sensitive element 53 (see FIG. 8). The output voltage of the magneto-sensitive element 53 is adjusted to "0" at its neutral position.

The magneto-sensitive element 53 is positioned at the center of the magnetic field generated between the magnetic polar faces 40a and is initially oriented to be parallel to the direction of the magnetic flux of the magnetic field.

Figure 6:
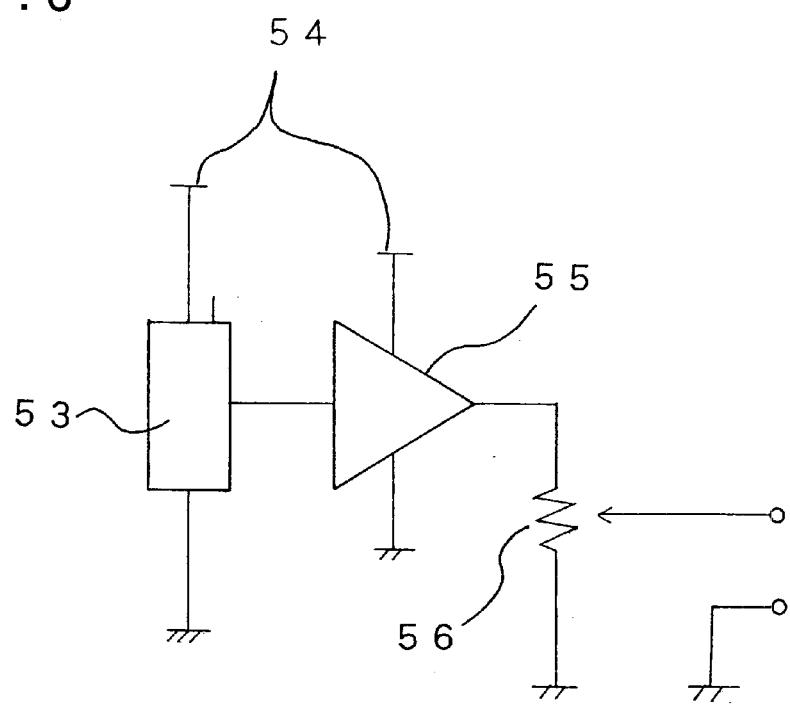
FIG. 6 is a connection diagram for a magneto-sensitive device or a magneto-sensitive element according to an embodiment of the present invention.

The magneto-sensitive element 53 is electrically connected with a power supply 54 as diagrammatically shown in FIG. 6. The magneto-sensitive element 53 changes its relative angle by "$\theta$" in the magnetic field and outputs voltage which corresponds to the angle "$\theta$" (see FIG. 7). The value of the output voltage can be obtained by mathematical multiplication of "sensitivity," "flux density" and "sin $\theta$" with required calculation adjustment.

The output voltage is provided to an amplifier 55, where the voltage is amplified. The amplified voltage is provided to ECU 8 for further processing (see FIG. 9).

In a preferred embodiment, there is further provided an output adjuster 56 for stabilization of the output voltage irrespective of the fluctuations in the strength of the magnetic field between the magnetic polar faces 40a.

When the steering wheel 1 is in the neutral position, the direction A of the magnetic flux between the magnetic polar faces 40a and the vertical direction B normal to the axial direction of the magneto-sensitive element 53 cross at right angles ($\theta$=0) as shown in FIG. 8(a) and the output voltage there is zero("0").

When the steering wheel 1 is turned right or left by a degree, the steering torque generated in a corresponding direction is transmitted to the output shaft 4 through the gear case 2 and the torsion bar spring 21, and changes the direction of the front wheels 7 of the vehicle as intended.

The steering torque from the steering wheel 1 twists the torsion bar spring 21 by an angle and displaces the sleeve 23 correspondingly. The displacement of the sleeve 23 turns the turn plate 35 by means of the protrusion 36 which rests on the circumferential step 28. The magnet casing 34 is then angularly displaced and the magnet device 40 is together turned by an angle "+$\theta$", creating an angle between the magneto-sensitive element 53 and the direction of the magnetic flux between the magnetic polar faces 40a, and an output voltage E1 is generated as shown in FIG. 7 as will be readily appreciated by an ordinary artisan in the relevant art.

The output voltage E1 is amplified at the amplifier 55 and input into ECU 8. ECU 8 then activates the assist motor 10, which provides assist torque which assists in changing the direction of the front wheels 7.

Figure 7:
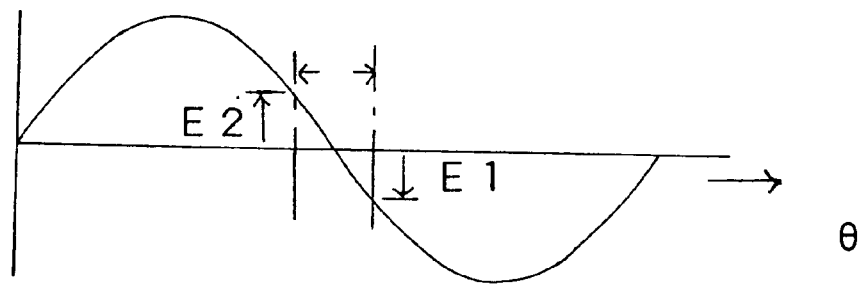
FIG. 7 is a graph showing a sine-wave relationship between the angular displacement of the magneto-sensitive element and the output voltage.

When the steering wheel 1 is turned in the other direction, the magnet device 40 is turned in the other direction by an angle "−$\theta$", producing an output voltage E2 as shown in FIG. 7, which activates the assist motor 10 and assists in changing the direction of the front wheels 7 in the other direction.

The output voltage generated by the magneto-sensitive element 53 is provided in a sine wave. However, as the magnet device 40 is displaced only within the "linear" range specified in FIG. 7, the output voltage can be regarded as provided in liner proportion to the angular displacement of the magneto-sensitive element 53.

The potentiometer 30 according to the present invention has practically eliminated "friction", where the magnet device 40 and the magneto-sensitive element 53 are held spatially separated. Thus, the output voltage generated by the potentiometer 30 of the present invention will not be discontinued or interrupted. The potentiometer 30 of the present invention is thus exceptionally durable and will provide long lasting reliability.

The magnet device 40 consisting of a permanent magnet base 41 and a pair of magnetic legs 42 provides homogeneous and stable magnetic flux unlike a simple unitary magnet device. The magnet device 40 which is embedded in the magnet casing 34 provides further stability and easy assembling.

Figure 12:
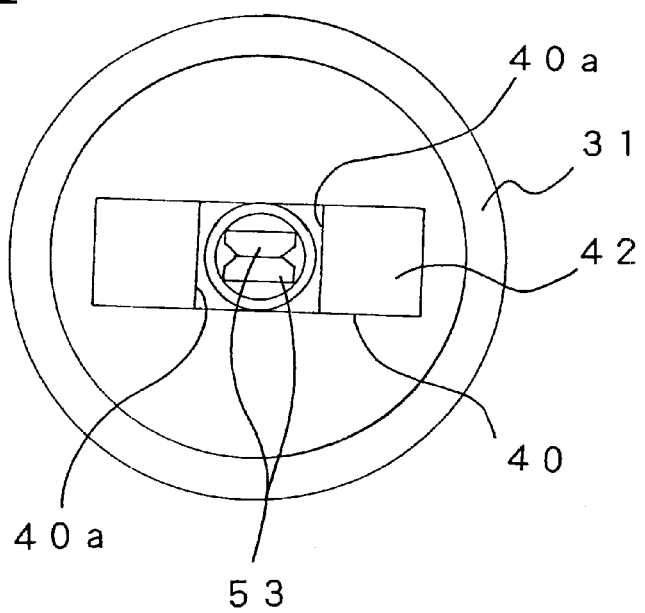
FIG. 12 is a sectional view of a potentiometer according to another embodiment of the present invention, where two magneto-sensitive elements are utilized as a magneto-sensitive device.

In another preferred embodiment of the present invention, two magneto-sensitive elements 53 are utilized instead of one, where the two magneto-sensitive elements 53 are housed in the axial cylinder 52*a* of the adjustment casing member 52 as shown in FIG. 12. This arrangement will provide an improvement over the foregoing embodiments utilizing a single magneto-sensitive element 53, in which the average value of the output voltage of the dual magneto-sensitive elements 53 is utilized for generation of the assist torque. In this way, still more reliable and stable assist torque can be provided.

Another advantage in utilizing the dual magneto-sensitive elements 53 is that the whole power steering system is protected against malfunctioning of one of the two magneto-sensitive elements 53.

The present invention has been described using various preferred embodiments. It is to be noted that these embodiments are presented only to describe the present invention and not to limit the scope of the present invention. The present invention is limited only by the appended claims.

What is claimed is:

1. A potentiometer for use in an electric power steering system of a vehicle for generation of assist torque, said power steering system including a torsion bar spring which receives steering torque and is twisted thereby, said potentiometer comprising:
    a magnet device having two magnetic polar faces which create a magnetic field therebetween; and
    a magneto-sensitive device placed in said magnetic field between said magnetic polar faces;
    wherein said magnet device is rotatable relative to said magneto-sensitive device in proportion to the twist of said torsion bar spring and changes the relative angle between said magneto-sensitive device and said magnetic field causing said potentiometer to generate voltage for use in generating assist torque.

2. The potentiometer according to claim 1, further comprising:
    a housing having an engagement bore;
    a magnet casing partially received in said engagement bore which pivots relative to said engagement bore in proportion to the twist of said torsion bar spring; and
    an element casing provided co-axially with said engagement bore;
    wherein said magnet device is fixedly mounted on said magnet casing and pivots together.

3. The potentiometer according to claim 2, wherein said magnet device is integrally embedded in said magnet casing with said magnetic polar faces exposed.

4. The potentiometer according to claim 2, wherein said magneto-sensitive device is dually provided magneto-sensitive elements.

5. The potentiometer according to claim 2, wherein the magneto-sensitive device is rectangular.

6. The potentiometer according to claim 1, wherein said magneto-sensitive device is dually provided magneto-sensitive elements.

7. The potentiometer according to claim 1, wherein the magneto-sensitive device is rectangular.

8. The potentiometer according to claim 1, wherein said assist torque is provided by an assist motor.

9. A potentiometer for use in an electric power steering system of a vehicle for generation of assist torque, said power steering system including a torsion bar spring which receives steering torque and is twisted thereby, said potentiometer comprising:
    magnetic field having polar faces and creating means creating a magnetic field between said polar faces; and
    a magneto-sensitive device placed in said magnetic field between said polar faces;
    wherein said magnetic field creating means is rotatable relative to said magneto-sensitive device in proportion to the twist of said torsion bar spring and changes the relative angle between said magneto-sensitive device and said magnetic field causing said potentiometer to generate voltage for use in generating assist torque.

10. The potentiometer according to claim 9, wherein the magnetic field creating means comprises a magnet device having two magnetic polar faces which create a magnetic field therebetween.

11. The potentiometer according to claim 9, further comprising:
    a housing having an engagement bore;
    a magnet casing partially received in said engagement bore which pivots relative to said engagement bore in proportion to the twist of said torsion bar spring; and
    an element casing provided co-axially with said engagement bore,
    wherein said magnet device is fixedly mounted on said magnet casing and pivots together.

12. A method of operating a potentiometer linked with a torsion bar spring which receives steering torque from a steering wheel of a vehicle, said method comprising:
    providing a magnet device having two magnetic polar faces which create a magnetic field therebetween;
    maintaining a magneto-sensitive device in said magnetic field between said magnetic polar faces; and
    rotating said magnet device relative to said magneto-sensitive device in proportion to the twist of said torsion bar spring to provide an output voltage in proportion to the twist of the torsion bar.

13. The method of claim 12, wherein rotating comprises rotating said magneto-sensitive device.

14. A potentiometer for use in an electric power steering system of a vehicle for generation of assist torque, said power steering system including a torsion bar spring which receives steering torque and is twisted thereby, said potentiometer comprising:
    a magnet device having two magnetic polar faces which create a magnetic field therebetween, said magnet device comprising a permanent magnet base and a pair of generally L-shaped magnetic legs which stretch from opposite ends of said magnetic base in parallel, said magnetic polar faces being provided on the free ends of said magnetic legs; and
    a magneto-sensitive device placed in said magnetic field between said magnetic polar faces;
    wherein said magnet device is rotatable relative to said magneto-sensitive device in proportion to the twist of said torsion bar spring and changes the relative angle between said magneto-sensitive device and said magnetic field causing said potentiometer to generate voltage for use in generating assist torque.

15. A potentiometer for use in an electric power steering system of a vehicle for generation of assist torque, said power steering system including a torsion bar spring which receives steering torque and is twisted thereby, said potentiometer comprising:
    a magnet device having two magnetic polar faces which create a magnetic held therebetween, said magnet device comprising a permanent magnet base and a pair of generally L-shaped magnetic legs which stretch from opposite ends of said magnetic base in parallel, said magnetic polar faces being provided on the free ends of said magnetic legs;

a magneto-sensitive device placed in said magnetic field between said magnetic polar faces;

a housing having an engagement bore;

a magnet casing partially received in said engagement bore which pivots relative to said engagement bore in proportion to the twist of said torsion bar spring; and an element casing provided co-axially with said engagement bore;

wherein said magnet device is rotatable relative to said magneto-sensitive device in proportion to the twist of said torsion bar spring and changes the relative angle between said magneto-sensitive device and said magnetic field causing said potentiometer to generate voltage for use in generating assist torque and wherein said magnet device is fixedly mounted on said magnet casing and pivots together.

16. A potentiometer for use in an electric power steering system of a vehicle for generation of assist torque, said power steering system including a torsion bar spring which receives steering torque and is twisted thereby, said potentiometer comprising:

a magnet device having two magnetic polar faces which create a magnetic field therebetween;

a magneto-sensitive device placed in said magnetic field between said magnetic polar faces;

a housing having an engagement bore;

a magnet casing partially received in said engagement bore which pivots relative to said engagement bore in proportion to the twist of said torsion bar spring; and an element casing provided co-axially with said engagement bore, said element casing being angularly adjustable relative to said housing;

wherein said magnet device is rotatable relative to said magneto-sensitive device in proportion to the twist of said torsion bar spring and changes the relative angle between said magneto-sensitive device and said magnetic field causing said potentiometer to generate voltage for use in generating assist torque and wherein said magnet device is fixedly mounted on said magnet casing and pivots together.

17. A potentiometer for use in an electric power steering system of a vehicle for generation of assist torque, said power steering system including a torsion bar spring which receives steering torque and is twisted thereby, said potentiometer comprising:

a magnet device having two magnetic polar faces which create a magnetic field therebetween; and a magneto-sensitive device placed in said magnetic field between said magnetic polar faces, said magneto-sensitive device being electrically connected to an output amplifier and an output adjuster;

wherein said magnet device is rotatable relative to said magneto-sensitive device in proportion to the twist of said torsion bar spring and changes the relative angle between said magneto-sensitive device and said magnetic field causing said potentiometer to generate voltage for use in generating assist torque.

18. A potentiometer for use in an electric power steering system of a vehicle for generation of assist torque, said power steering system including a torsion bar spring which receives steering torque and is twisted thereby, said potentiometer comprising:

a magnet device having two magnetic polar faces which create a magnetic field therebetween;

a magneto-sensitive device placed in said magnetic field between said magnetic polar faces, said magneto-sensitive device being electrically connected to an output amplifier and an output adjuster;

a housing having an engagement bore;

a magnet casing partially received in said engagement bore which pivots relative to said engagement bore in proportion to the twist of said torsion bar spring; and an element casing provided co-axially with said engagement bore;

wherein said magnet device is rotatable relative to said magneto-sensitive device in proportion to the twist of said torsion bar spring and changes the relative angle between said magneto-sensitive device and said magnetic field causing said potentiometer to generate voltage for use in generating assist torque and wherein said magnet device is fixedly mounted on said magnet casing and pivots together.

* * * * *